(12) United States Patent
Sawanobori

(10) Patent No.: US 6,621,520 B1
(45) Date of Patent: Sep. 16, 2003

(54) DISPLAY UNIT OF DIGITAL CAMERA

(75) Inventor: Keiji Sawanobori, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/323,991

(22) Filed: Jun. 2, 1999

(30) Foreign Application Priority Data

Jun. 9, 1998 (JP) .......................................... 10-160409

(51) Int. Cl.$^7$ ..................... H04N 5/225; H04N 5/222; G09G 3/36
(52) U.S. Cl. .................. 348/341; 348/375; 348/333.02; 348/333.08; 345/102
(58) Field of Search ................................ 348/341, 375, 348/373, 207.99, 333.1, 333.01, 333.02, 333.05, 333.08, 333.06; 345/102; 359/487, 515; 362/31, 245, 84; 349/2, 139, 65, 62, 66

(56) References Cited

U.S. PATENT DOCUMENTS

| | | | |
|---|---|---|---|
| 4,909,604 A | * 3/1990 | Kobayashi et al. ........... 349/65 |
| 5,101,325 A | * 3/1992 | Davenport et al. ........... 362/31 |
| 5,313,225 A | 5/1994 | Miyadera | |
| 5,748,237 A | * 5/1998 | Ueda et al. ............. 348/333.08 |
| 6,034,750 A | * 3/2000 | Rai et al. ....................... 349/57 |
| 6,104,454 A | * 8/2000 | Hiyama et al. ................ 349/65 |
| 6,151,166 A | * 11/2000 | Matsushita et al. ........... 349/65 |
| 2001/0050716 A1 | * 12/2001 | Hashimoto et al. .... 348/333.01 |
| 2003/0063062 A1 | * 4/2003 | Tsumura et al. ............. 345/102 |

* cited by examiner

*Primary Examiner*—Aung S. Moe
(74) *Attorney, Agent, or Firm*—Greenblum & Bernstein, P.L.C.

(57) ABSTRACT

A display unit of a digital camera includes a liquid crystal display (LCD) panel that displays a photographed image by the digital camera on an image display area of the LCD panel, and displays symbolic information on an information area. A main back-light unit is provided to illuminate the image display area of the LCD panel, and a sub-back-light unit is provided to illuminate the information display area of the LCD panel, both of which can be independently driven.

13 Claims, 6 Drawing Sheets

DISPLAY UNIT OF DIGITAL CAMERA

BACKGROUND OF THE INVENTION

1. Field of the Invention

The present invention relates to a display unit of a digital camera, including a liquid crystal display (LCD) for displaying a photographed image.

2. Description of the Related Art

A digital camera is known that includes a LCD unit for displaying a photographed image and related information, such as a date, an operation mode and so forth. Usually, the LCD is illuminated by a back-light such that the displayed image is sufficiently illuminated even outdoors. The back-light has a high electric power consumption and exerts a negative influence upon a battery's duration of the digital camera. Symbolic information, such as a date, an operation mode and so forth, is generally displayed in an image display area of the LCD, and as such it is necessary to illuminate the LCD unit with the back-light even when only the information is displayed. Occasionally, an additional display for displaying only the information is utilized. However, the digital camera including such an additional display is complex and a total number of components is increased.

SUMMARY OF THE INVENTION

Therefore, an object of the present invention is to provide a display unit of a digital camera capable of displaying both a photographed image and information with minimal electric power consumption.

A display unit of a digital camera according to the present invention comprises a liquid crystal display (LCD) panel, a main back-light unit, a sub-back-light unit, and a driving circuit. The LCD panel displays a photographed image by the digital camera on an image display area of the LCD panel and displays a symbolic information on an information display area. The main back-light unit illuminates the image display area of the LCD panel. The sub-back-light unit illuminates the information display area of the LCD panel. The driving circuit independently drives the main back-light unit and the sub-back-light unit.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
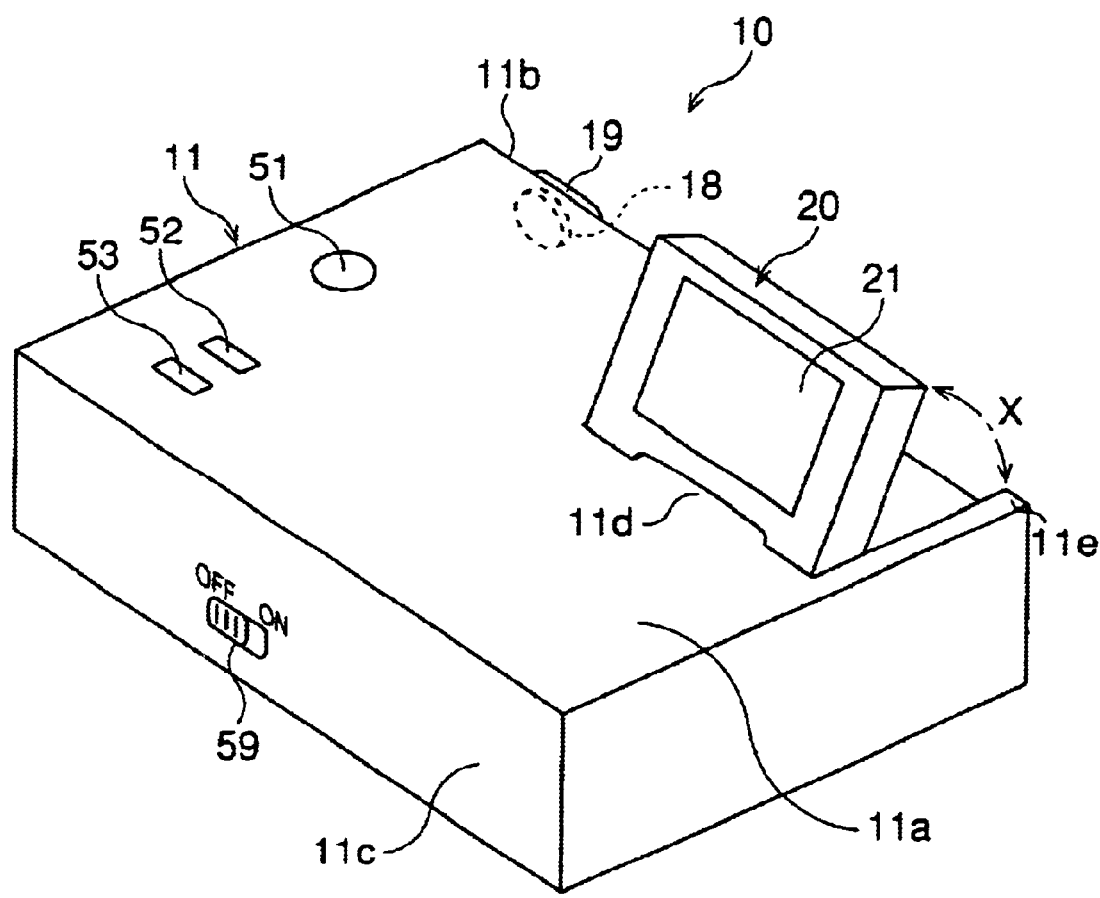
FIG. 1 is a perspective view showing a digital camera that includes a first embodiment of a display unit according to the present invention.
Figure 2:
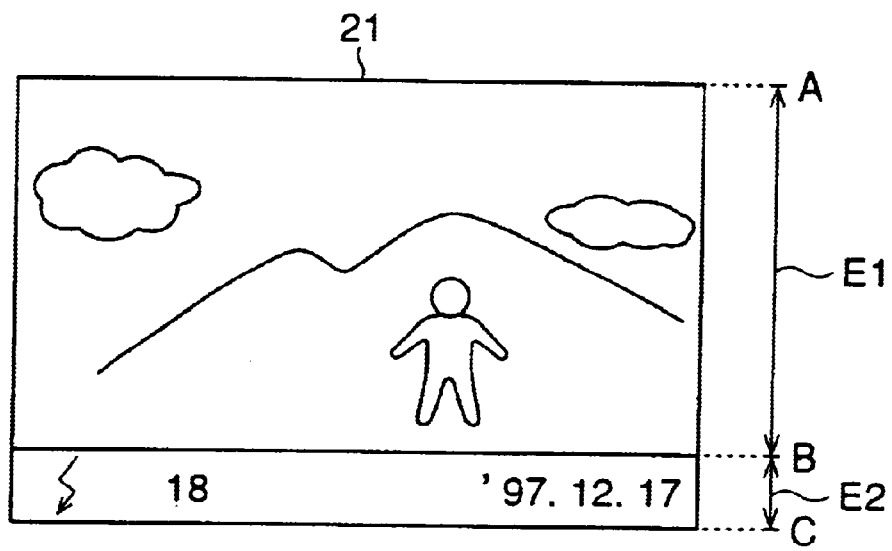
FIG. 2 is a view showing an image exhibited by the display unit of the first embodiment.

FIG. 1 is a perspective view showing a first embodiment of a digital camera according to the present invention. The digital camera 10 includes a camera body 11 of a rectangular parallelepiped shape. A display unit 20, pivotable at a hinge 11d on an upper surface 11a of the body 11, is swingable between an angle where the display unit 20 is disposed in a recess 11e on the upper surface 11a and an angle X where the display unit 20 projects from the upper surface 11a. The display unit 20 includes a liquid crystal display (LCD) panel 21 for displaying an image and symbolic information (FIG. 2). An optical system 19, having a lens 18, is disposed on a front surface 11b of the body 11 for photographing an image in a visual field thereof. A release button 51, a back-light selection button 52 and a mode selection button 53 are disposed on the upper surface 11a of the body 11, and a power switch 59 is disposed on a back surface 11c of the body 11.

FIG. 2 is a view showing an image exhibited by the LCD panel 21 of the display unit 20. The photographed image is displayed in a image display area E1 from a top A of the LCD panel 21 to a lower portion B adjacent to a bottom C of the LCD panel 21. The symbolic information, such as a date, an operation mode and so forth, are displayed on an information display area E2 between the portion B (a bottom) of the area E1 and the bottom C of the LCD panel 21. Therefore, the information display area E2 is separated from the image display area E1.

Figure 3:
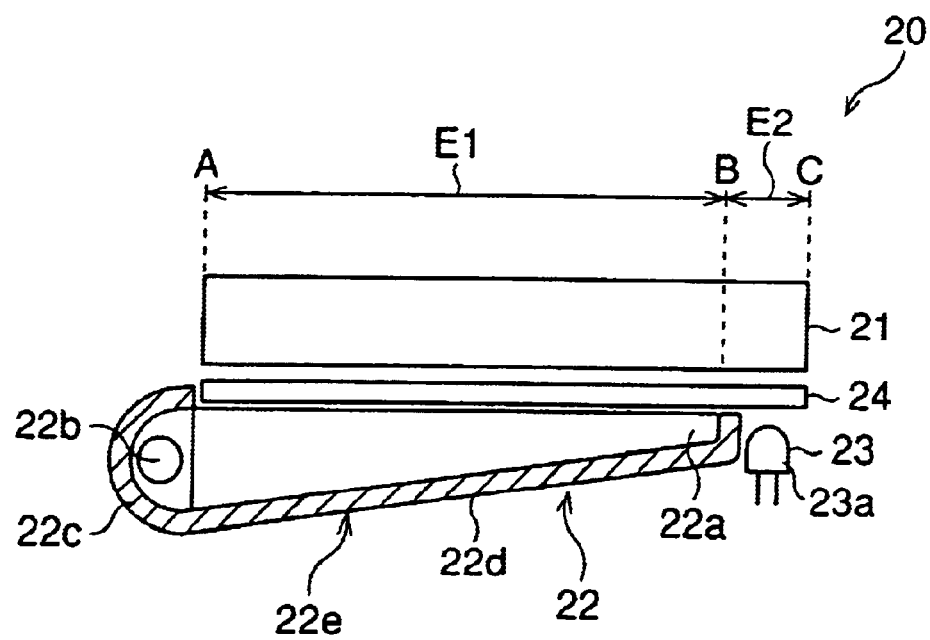
FIG. 3 is a sectional side view showing the display unit of the first embodiment.

As shown in FIG. 3, the LCD panel 21 is illuminated by a main, edge-light type back-light unit 22 and a sub-back-light unit 23 from a back side of the LCD panel 21. The main back-light unit 22 includes a fluorescent lamp light source 22b, a light transmitter 22a, and a reflector 22e. The light source 22b is a fluorescent tube, and the light transmitter 22a transmits light from the light source 22b toward image display area E1 of the LCD panel 21. The reflector 22e is a container-like concave mirror, which includes a semicircular cylindrical concave mirror 22c extending along a longitudinal axis of the light source 22b, and an inclined flat mirror 22d unitedly and uniformly connected to the semicircular cylindrical concave mirror 22c. Light from the light source 22b is reflected by the semicircular cylindrical concave mirror 22c substantially parallel to the LCD panel 21. The inclined flat mirror 22d extends along the LCD panel 21 and approaches the LCD panel 21 in a direction departing from the semicircular cylindrical concave mirror 22c. The light reflected by the semicircular cylindrical concave mirror 22c is then reflected by the inclined flat mirror 22d, and transmitted by the light transmitter 22a toward the image display area E1 of the LCD panel 21. A diffusion unit 24 is disposed along a total width of and parallel to a rear surface of the LCD panel 21, diffusing the light radiating from the main back-light unit 22.

The sub-back-light unit 23 includes a plurality of light emitting diodes (LEDs) 23a linearly aligned behind the information display area E2. One LED consumes less than 10% of an electric power consumed by the main back-light unit 22. Thus, the sub-back-light unit 23, consisting of two or three LEDs has significantly a lower electric power consumption in comparison with that of the main back-light unit 22. While the power in the digital camera 10 is turned on, the information display area E2 is illuminated by the sub-back-light unit 23.

The main back-light unit 22 and the sub-back-light unit 23 are independently driven. When the photographed image is displayed on the LCD panel 21, both the main back-light unit 22 and the sub-back-light unit 23 are driven, thus the image is illuminated together with the symbolic information. When only the symbolic information is to be displayed, only the sub-back-light unit 23 is driven and the main back-light unit 22 is not driven, thus electric power consumption is minimized.

Figure 4:
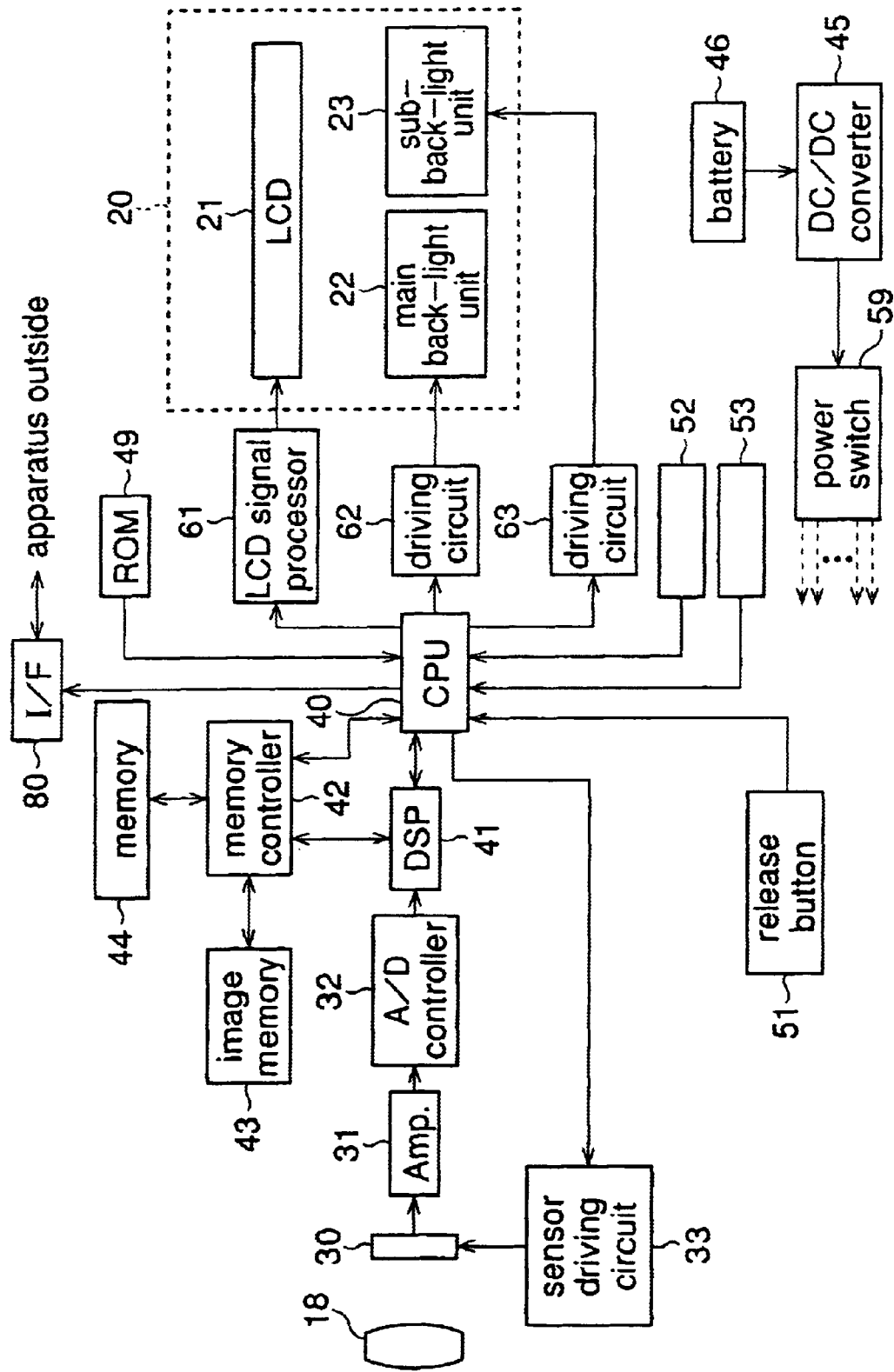
FIG. 4 is a block diagram of the digital camera in FIG. 1.

FIG. 4 is a block diagram of the digital camera 10. The optical system 19 focuses an optical image in the visual field on an image sensor (area sensor) 30. The optical image is converted into an analog electrical signal by the image sensor 30, amplified by an amplifier 31, and then converted by an A/D converter 32 into a digital image-pixel signal. The image sensor 30 is controlled by a sensor driving circuit 33. The sensor driving circuit 33 is controlled by a CPU 40.

An output of the digital image-pixel signal from the A/D converter 32 is input to a digital signal processor (DSP) 41 such that the output signal undergoes various image-signal processings, such as shading correction, interpolation and noise reduction. The processed digital image-pixel signal in the DSP 41 is once stored in an image memory 43 according to a control of a memory controller 42. The processed digital image-pixel signal stored in the image memory 43 is read by the memory controller 42, controlled by a CPU 40, from the image memory 43, and encoded by an LCD signal processor 61 from R (red), G (green) and B (blue) digital signals to a video signal format consisting of a color differential signals (Cr, Cb) and a luminance signal (Y). Since images are continuously input to the image sensor 30 and transferred to the image memory 43, the image in the visual field is displayed by the LCD panel 21 as a motion picture in real-time. The symbolic information, such as a date, an operation mode and so forth, are generated by the CPU 40. The date information is read from a clock circuit (not shown) in the CPU40, and the operation mode information is supplied from the mode selection switch 53 to the CPU 40. The CPU 40 reads character and symbolic data from a ROM 49, in accordance with the date information and the operation mode information. The CPU 40 transfers the character and symbolic data to a LCD signal processor 61, such that the information is displayed on the area E2.

The main back-light unit 22 and sub-back-light unit 23 are independently driven by driving circuits 62 and 63, respectively.

When the release button 51 is depressed halfway, images are continuously input to the image sensor 30 and transferred to the image memory 43a, such that the moving image is displayed in the area E1. When the release button 51 is fully depressed, the still image is stored in a memory 44, which stores photographed still images successively.

In the body 11, a battery 46 is disposed for supplying electric power to the components of the digital camera 10, such as the main back-light unit 22, sub-back-light unit 23 and sensor driving circuit 33. The electric power of the battery 46 is supplied, through a DC/DC converter 45 for stabilizing the electric power, to the components. The power switch 59 is connected to an output of the DC/DC converter 45 for switching the electric power.

An interface 80 is connected to the CPU 40, for outputting the image from the memory 44 to a personal computer (not shown) or other peripheral apparatus.

By pushing the mode selection switch 53, the operation mode of the digital camera 10 is successively changed in an order of: "monitor" mode, "photography" mode and "slide" mode.

In the "monitor" mode, an image focused on the image sensor 30 is displayed by the display unit 20 in real-time, as a moving image, and a photographing condition is selected and adjusted. An angle of view, an exposure value and other conditions are manually adjusted. In this mode, the main back-light unit 22 and the sub-back-light unit 23 are driven, thus both the image display area E1 and the information display area E2 are illuminated. However, the "monitor" mode is not so frequently selected.

In the "photography" mode, first, the display of the moving image is stopped and only the information is displayed. The main back-light unit 22 is turned off and only the sub-back-light unit 23 is turned on. When the release button 51 is depressed halfway, the moving image is displayed again in the area E1. At this time, both the main back-light unit 22 and the sub-back-light unit 23 are turned on. If the halfway depression is released, the display of the moving image is stopped, and only the information is displayed. At this time, the main back-light unit 22 is turned off and only the sub-back-light unit 23 is turned on. When the release button 51 is fully depressed after the halfway depression of the release button 51, a still image from the image sensor 30 is displayed in the image display area E1, and stored in the memory 44. The photographer can thus observe and confirm the image to be photographed. Then, after the still image is stored in the memory 44, the display of the still image in the area E1 is stopped, and only the information is displayed by using the sub-back-light unit 23. In the "photography" mode, the main back-light unit 22 is turned off unless the release button 51 is depressed, thus enabling a lower power consumption.

In the "slide" mode, the photographed still image, stored in the memory 44, is read out by the LCD signal processor 61, and is displayed on the area E1. When a plurality of still images have been already photographed, these images are successively displayed, similarly to a slide projector. On starting the "slide" mode, the main back-light unit 22 is turned off, and is driven again when the still images are started to be displayed.

Since the main back-light unit 22 is driven only when the image is displayed in the image display area E1, the electric power consumption is minimized. An LCD panel only for information display is unnecessary, so the digital camera 10 is simplified and a total number of components is decreased in comparison with a conventional digital camera.

The main back-light unit 22 and the sub-back-light unit 23 can be manually controlled by the back-light selection button 52, successively and scrolling through commands in rotation. For example, in a first selection, only the main back-light unit 22 is driven; in a second selection, additionally, the sub-back-light unit 23 is driven; in a third selection, the main back-light unit 22 is turned off; in a fourth selection, the sub-back-light unit 23 is also turned off.

Figure 5:
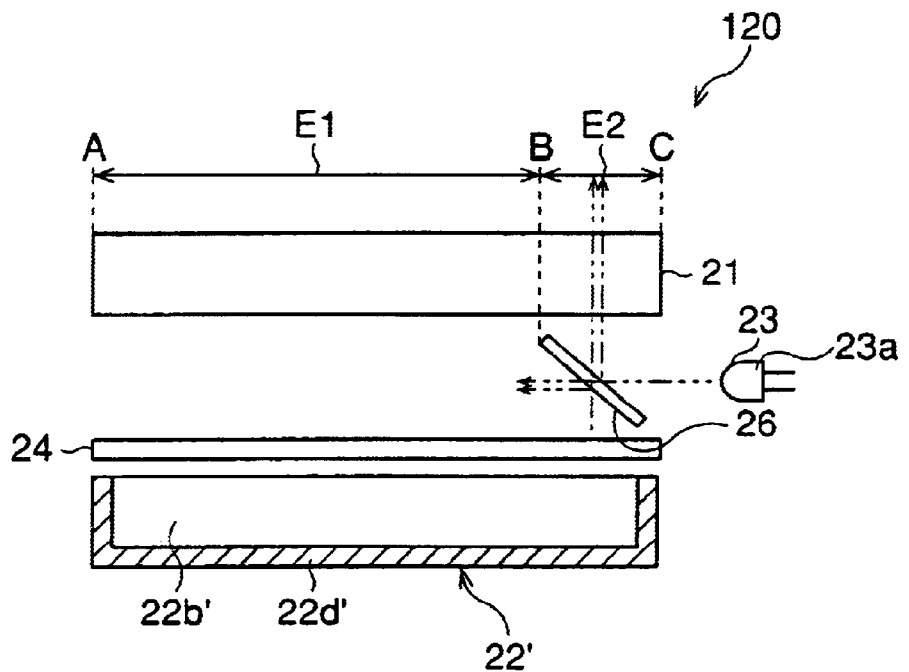
FIG. 5 is a sectional side view showing a display unit of a second embodiment.

FIG. 5 is a sectional side view showing a display unit 120 of a second embodiment. Like references indicate identical components to those of the first embodiments. In this embodiment, a main back-light unit 22' includes a flat fluorescent lamp 22b' as a light source and a reflector 22d' for reflecting light of the flat fluorescent lamp 22b'. While a sub-back-light unit 23 includes a plurality of light emitting diodes 23a similar to those of the first embodiment. A half mirror 26 is positioned behind the information display area E2 between the diffusion unit 24 and the LCD panel 21, which transmits the light from the main back-light unit 22', and reflects the light from the sub-back-light unit 23 toward the information area E2.

When the image is displayed, both the image display area E1 and the information display area E2 are illuminated by the main back-light unit 22'. While the image is displayed, the sub-back-light unit 23 is turned off. When only the information is displayed, the main back-light unit 22' is turned off and the sub-back-light unit 23 is driven. In addition to the effect of the first embodiment, the electric power is further decreased when the image is displayed together with the information, since the information is illuminated by the main back-light unit 22'.

In a modification, the main back-light unit 22' may be constructed from edge-light type back-light unit, similarly to the first embodiment.

Figure 6:
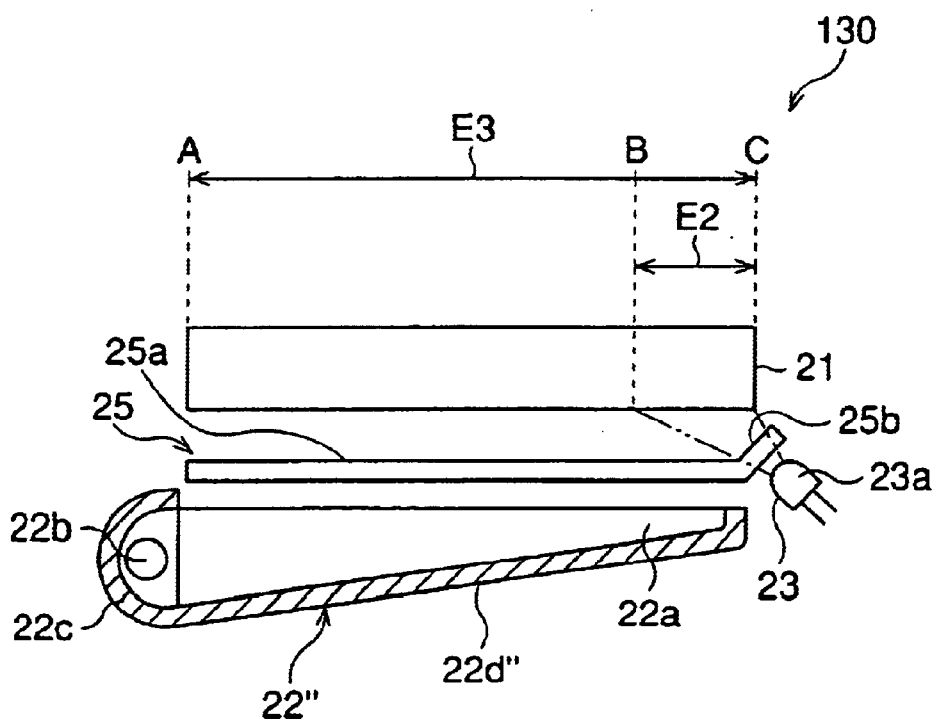
FIG. 6 is a sectional side view showing a display unit of a third embodiment.

FIG. 6 is a sectional side view showing a display unit 130 of a third embodiment. Again, like references indicate identical components to those of the first embodiment. Differently from the first embodiment, an image display area E3 is disposed over the total area of the LCD panel 21 and an information display area E2 is disposed within the image display area E3, occasionally, the area E3 can be entirely used as an image display area. A similar main back-light unit 22" to that of the first embodiment is disposed, adjacent to the rear surface of the LCD panel 21, and illuminates a total area of the LCD panel 21 via an external inclined flat mirror 22d". The sub-back-light unit 23 includes a plurality of light emitting diodes 23a, similarly to those of the first embodiment. A diffusion unit 25 includes a main diffusion portion 25a, which extends along a total width of and parallel to the LCD panel 21, and a sub-diffusion portion 25b, which angularly projects from an end of the main diffusion portion 25a to face the information display area E2. The main diffusion portion 25a diffuses light from the main back-light unit 22", and the sub-diffusion portion 25b diffuses light from the sub-back-light unit 23.

In a modification, the main-back-light unit 22" may be constructed from a flat fluorescent lamp, similarly to the second embodiment.

When the image is displayed, both the image display area E3 and the information display area E2 are illuminated by the main back-light unit 22". While the image is displayed, the sub-back light unit 23 is turned off. When only the information is displayed, the main back-light unit 22" is turned off and the sub-back-light unit 23 is driven. A similar effect to that of the second embodiment is achieved in the third embodiment.

Figure 7:
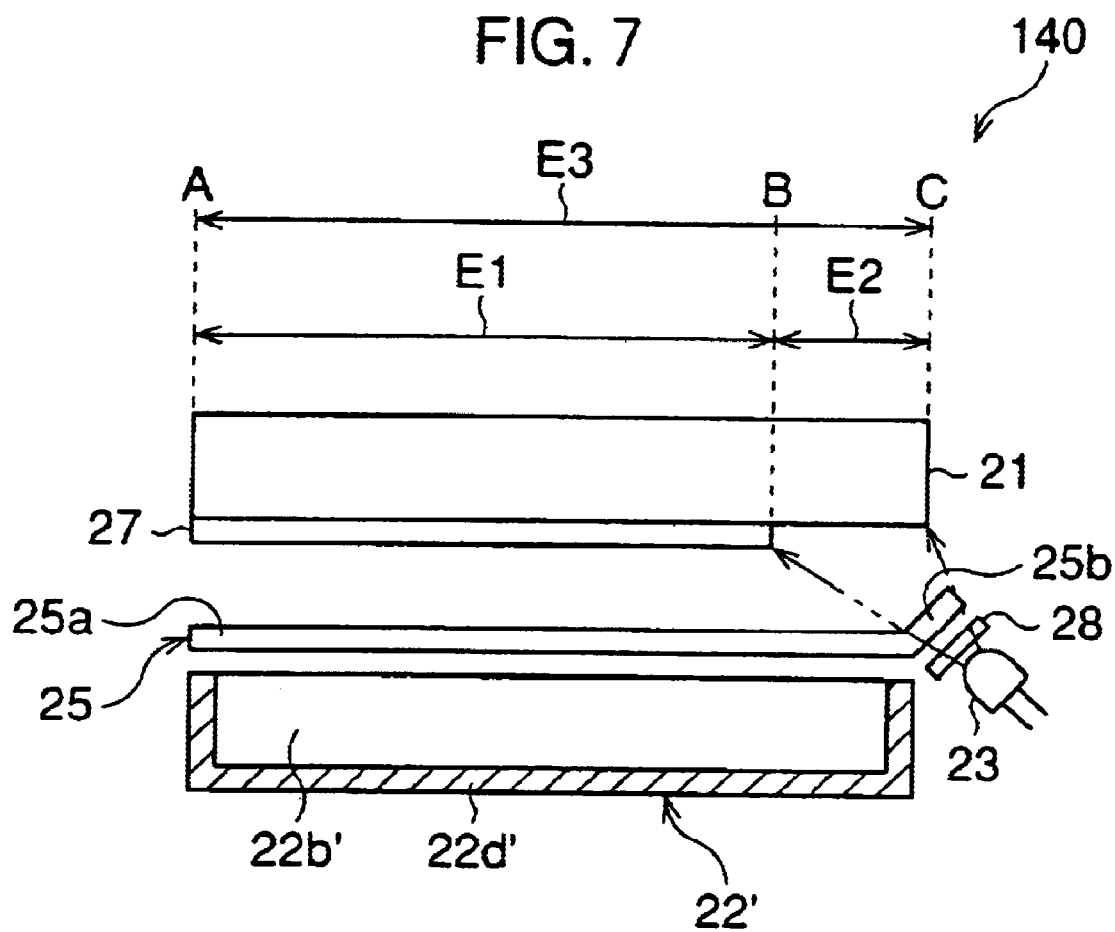
FIG. 7 is a sectional side view showing a display unit of a fourth embodiment.

FIG. 7 is a sectional side view showing a display unit 140 of a fourth embodiment. Again, like references indicate identical components to those of the third embodiment. Similarly to the third embodiment, an image display area E3 is disposed over the total area of the LCD panel 21 and an information display area E2 is disposed within the image display area E3. A diffusion unit 25 includes a main diffusion portion 25a, which extends along a total width of and parallel to the LCD panel 21, and a sub-diffusion portion 25b which angularly projects from an end of the main diffusion portion 25a to face the information display area E2. The other area E1, being independent of the information display area E2, is a partial area for image display. Similarly to the second embodiment, a main back-light unit 22' is disposed adjacent to the rear surface of the LCD panel 21, which includes a flat fluorescent lamp 22b' as a light source and a reflector 22d' for reflecting light from the flat fluorescent lamp 22b'. Color filters 27 and 28 are disposed, corresponding to the main back-light unit 22' and the sub-back-light unit 23, respectively. Light of the main back-light unit 22' and the sub-back-light unit 23 are different in wavelength, and the color filters 27 and 28 have high transmission factors with respect to the light of the main back-light unit 22' and the sub-back-light unit 23, respectively. The color filter 27 is adhered to the rear surface of the LCD panel 21, at a position corresponding to the partial area E1, and the color filter 28 is positioned between the sub-diffusion portion 25b and the sub-back-light unit 23. When both the partial area E1 and the information display area E2 are illuminated, the information display area E2 has a higher luminosity than the partial area E1, such that the symbolic information is clear even when there is an image displayed over the area E3 which interferes with the information, for example, due to a image using of similar color to that of the information. As the filter 27 cuts off the light of the sub-back-light unit 23, a border between the area E1 and the area E2 is emphasized. The image display area E1 is not illuminated when only the information display area E2 is to be illuminated, thus the information is clearly displayed while minimizing power consumption. In this embodiment, the total area E3 of the LCD panel 21 can be used as an image display area.

When the image and the information are displayed, the area E1 is illuminated by the main back-light unit 22', and the information display area E2 is illuminated by the main back-light unit 22' and the sub-back-light unit 23. When only the information is displayed, the main back-light unit 22' is turned off.

In a modification, the main-back-light unit 22' may be incorporate an edge-light, similarly to the first embodiment.

Figure 8:
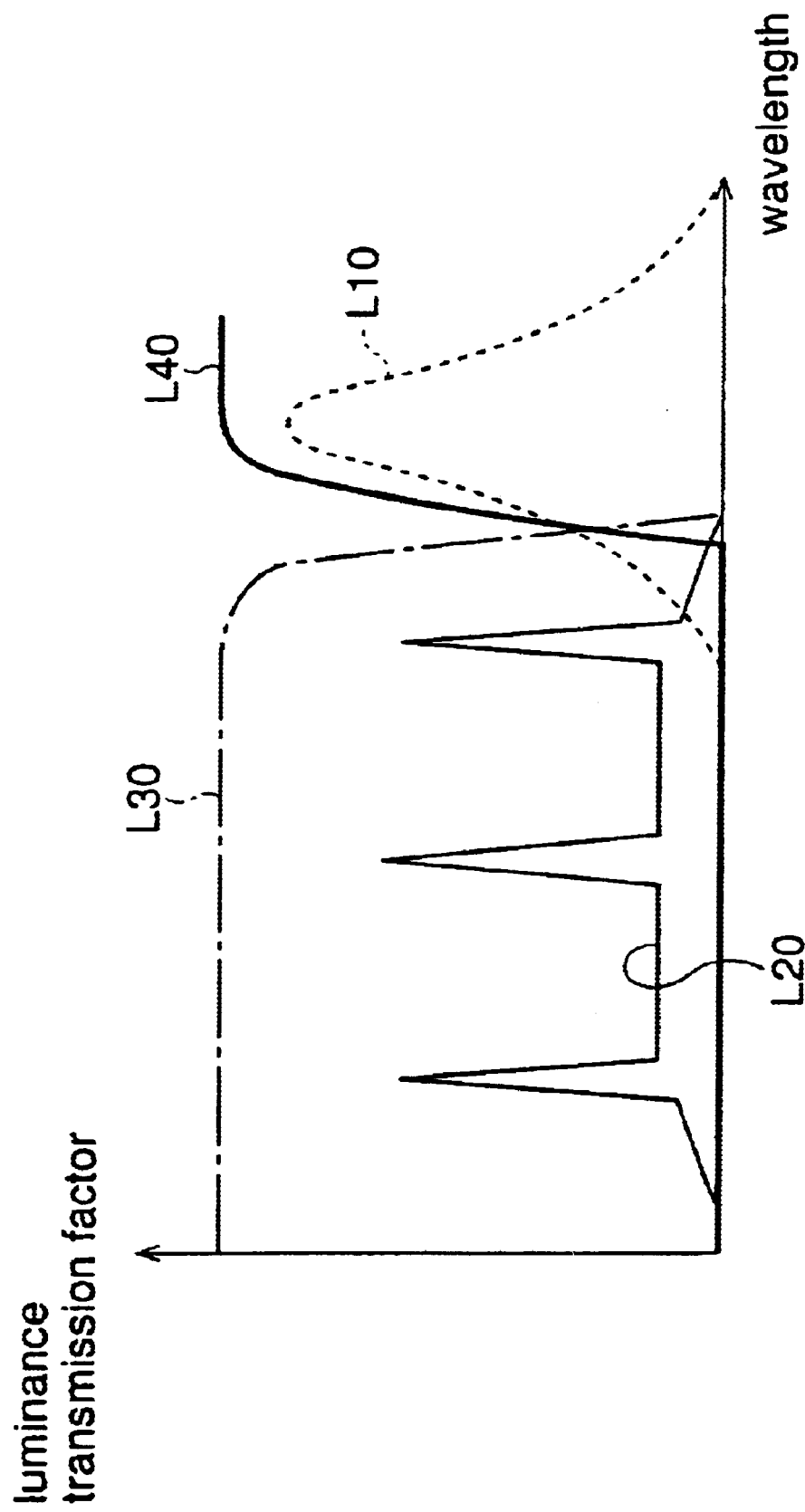
FIG. 8 is a graph showing a spectrum characteristic of a wavelength/luminance relationship of light generated by a back-light unit, and a transmission factor of color filters used in the fourth embodiment.

FIG. 8 is a graph showing a spectrum characteristic of a wavelength/luminance relationship of light generated by the back-light(22, 22', 22"), and a transmission factor of the color filters 27 and 28. The color filter 27 has a high transmission factor L30 for light of shorter wavelength, while the color filter 28 has a high transmission factor L40 for light of longer wavelengths different than the wavelengths transmitted by the color filter 27. A spectrum (luminance) of the light of the main back-light unit 22' is shown by L20, and a spectrum (luminance) of the light of the sub-back-light unit 23 is shown by L10. The spectrums L10 and L20 have high values over different wavelength ranges. When only the information is to be displayed, the light of the sub-back light unit 23 is not transmitted toward the partial area E1 by color filter 27. Therefore, from the fourth embodiment, in addition to a similar effect to that of the prior embodiments, the information is also clearly displayed. In a modification, the light of the sub-back-light unit 23 may have a different wavelength range from that of the light of the main back-light unit 22. Thus, the color filter 28 may be omitted.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.10-160409 (filed on Jun. 9, 1998) which is expressly incorporated herein, by reference, in its entirety.

What is claimed is:

1. A display unit of a digital camera comprising:
   a liquid crystal display (LCD) panel that displays a photographed image by said digital camera on an image display area of said LCD panel and displays a symbolic information on an information display area;

a main back-light unit that illuminates said image display area of said LCD panel;

a sub-back-light unit that illuminates said information display area of said LCD panel; and a driving circuit that independently drives said main back-light unit and said sub-back-light unit.

2. The display unit of the digital camera of claim 1, wherein said information display area is separated from said image display area.

3. The display unit of the digital camera of claim 2, further comprising:

a diffusion unit that extends along a total width of and parallel to said LCD panel to diffuse light from said main back-light unit; and a half-mirror disposed between said LCD panel and said diffusion unit such that light from said sub-back-light unit is reflected by said half-mirror toward said information area and that a light from said main back-light unit passes through said half-mirror toward said information display area.

4. The display unit of the digital camera of claim 1, wherein said image display area is a total area of said LCD panel, and said information display area is disposed within said image display area.

5. The display unit of the digital camera of claim 4, further comprising a diffusion unit that includes:

a main diffusion portion extending along a total width of and parallel to said LCD panel, which diffuses light from said main back-light unit; and a sub-diffusion portion which angularly projects from an end of said main diffusion portion to face said information display area to diffuse light from said sub-back-light unit.

6. The display unit of the digital camera of claim 5, wherein said light of said main back-light unit and said sub-back-light unit have different wavelength range, and said display unit further comprises color filter that selectively transmit said light of said main back-light unit.

7. The display unit of the digital camera of claim 1, wherein said main back-light unit comprises:

a light source;

a reflector that reflects light from said light source to said image display area; and a light transmitter that transmits said light from said light source to said image display area.

8. The display unit of the digital camera of claim 7, wherein said light source is a fluorescent tube.

9. The display unit of the digital camera of claim 7, wherein said reflector is a container-like concave mirror.

10. The display unit of the digital camera of claim 9, wherein said concave mirror comprises:

a semicircular cylindrical concave mirror disposed parallel to said light source, that reflects said light from said light source substantially parallel to said LCD panel; and an inclined flat mirror that is uniformly connected to said semicircular cylindrical concave mirror and is inclined such that said light reflected by said semicircular cylindrical concave mirror is reflected by said inclined flat mirror toward said image display area.

11. The display unit of the digital camera of claim 1, wherein said main back-light unit comprises:

a flat fluorescent lamp as a light source; and a reflector that reflects light from said light source to said image display area.

12. The display unit of the digital camera of claim 1, wherein said sub-back-light unit comprises a plurality of light emitting diodes (LEDs) as a light source.

13. The display unit of the digital camera of claim 1, further comprising a diffusion unit that diffuses light from said main back-light unit and said sub-back-light unit.

* * * * *